Dec. 29, 1931.  E. DUNFORD  1,838,174
CLUTCH ACTUATING DEVICE
Filed Sept. 11, 1929
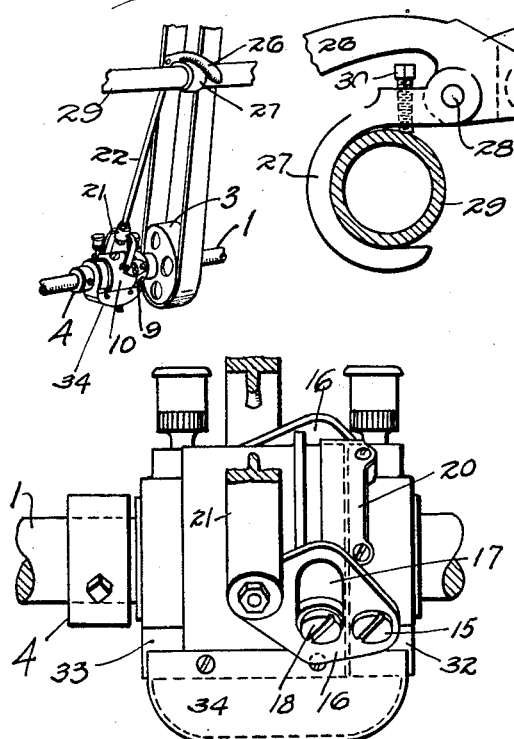
Inventor
Ernest Dunford
By Rodney Bedell
Attorney Patented Dec. 29, 1931

1,838,174

UNITED STATES PATENT OFFICE

ERNEST DUNFORD, OF ST. LOUIS, MISSOURI, ASSIGNOR TO LANDIS MACHINE COMPANY, OF ST. LOUIS, MISSOURI, A CORPORATION OF MISSOURI

CLUTCH ACTUATING DEVICE

Application filed September 11, 1929. Serial No. 391,856.

My invention relates to clutch mechanism of the type illustrated in Patent Number 1,546,012 issued to Denslinger et al. in which sleeves mounted on a shaft are thrust away from each other to force a loose member into contact with a driving member.

In the clutch described in the above-mentioned patent, the telescoping members which control the sleeves have a single bearing on each other on one side of the shaft and have a single cam for operating the members. As a result of this construction, the members tend to tilt on the shaft producing a binding effect. The operator's strength is applied to the clutch by twisting a handle at the end of the cam rod which arrangement limits the leverage, particularly when the telescoping members bind as mentioned.

The main object of my present invention is to avoid similar tendencies by balancing the application of forces by applying them to opposite sides of the telescoping members and by providing extended bearings of the telescoping members on each other.

Another object of my invention is to enclose the movable parts to exclude dust and provide suitable lubrication therefor so that they will operate more easily.

Another object of my invention is to provide an operating structure in which the leverage may be increased as desired.

Another object of my invention is to facilitate the application of the operating handle to the frame of the machine to which the clutch is applied.

In the accompanying drawings illustrating a preferred embodiment of my invention—

Figure 1 is a perspective of my clutch actuating device applied to a shoe repair machine.

Figure 2 is an end view of my device and includes sections through the driving shaft and frame of the machine.

Figure 3 is a side view of my device showing only that part of the device around the shaft.

Figures 4 and 5 are transverse sections of my device taken on the line 4—4 of Figure 2 and showing in detail those elements of the clutch around the shaft in retracted and projected positions, respectively.

In Figures 4 and 5 my clutch actuating device is shown mounted upon a driving shaft 1 and associated with a driving collar 2 fixed upon the shaft and a pulley 3 rotatably mounted upon the shaft, the driving collar and pulley having opposed faces adapted to be frictionally engaged with each other by the clutch actuating device. Spaced from pulley 3 is a holding collar 4 also fixed upon the shaft. Between pulley 3 and holding collar 4 and adapted to bear against their sides are two cylindrical sleeves 5 and 6 surrounding shaft 1 and adapted to rotate with the shaft or remain stationary.

Each of sleeves 5 and 6 has a radial projection 14 between which projections spring 8 may be seated and may function to force the sleeves away from each other and into contact with holding collar 4 and pulley 3 which in turn is thrust into frictional contact with driving collar 2 to cause pulley 3 to rotate with shaft 1.

Journalled on sleeves 5 and 6 are housing members 9 and 10 which entirely enclose the above-mentioned sleeves substantially throughout the lengths of the sleeves. Members 9 and 10 have shoulders 13 which abut the outsides of projections 14 on sleeves 5 and 6 at all times except when the sleeves are thrust apart to engage the clutch and the members 9 and 10 are fully extended from each other, by a means to be hereinafter explained, when there is a space between each of the projections 14 and shoulders 13 so that there will be no binding action of the members 9 and 10 on the sleeves 5 and 6 when the clutch is engaged and the sleeves must turn with the shaft while the members 9 and 10 remain stationary. Thus, the outward pressure of spring 8 when the clutch is not engaged is transmitted through projections 14 and shoulders 13 so that members 9 and 10 are forced outwardly to the same extent as sleeves 5 and 6, but also any force exerted to move members 9 and 10 toward each other is transmitted through shoulders 13 and projections 14, against spring 8, so that sleeves 5 and 6 are forced toward each other to substantially the same extent as members 9 and 10 and the clutch disengaged and pulley 3 freed from the pressure thrusting it against collar 2.

Members 9 and 10 have cylindrical portions 11 and 12 in telescoping relation to each other, portion 11 being adapted to slide freely within portion 12, allowing the members 9 and 10 to move outwardly without disalinement and without uncovering any part of the sleeves, thus protecting the interior of the clutch from the introduction of dirt or moisture or other foreign elements that might damage it.

On diametrically opposed points of member 9 are outwardly extending studs 15. Corresponding studs 18 are mounted on member 10. Pivoted upon each stud 15 is a plate 16, the pivot point being near one of the ends of the plate. Intermediate the ends of each plate is a cam slot 17 having one end substantially farther from the pivot point of the plate than the other end. Each slot 17 receives a stud 18 fitted with a bushing 18a on member 10. On the other end of each plate, a leg of yoke 21 is pivoted by means of an element 19. Obviously, if yoke 21 is moved downwardly, plates 16 will turn downwardly on pivots 15 moving slots 17 downwardly with respect to studs 18, leaving studs 18 free to move farther away from studs 15 under the thrust of spring 8 and the clutch will be engaged as hereinbefore explained. But slots 17 are long enough to allow members 9 and 10 to be pushed from each other after the clutch is engaged so that in the engaged position of the clutch there is a space between shoulders 13 of the members 9 and 10 and projections 14 of the sleeves 5 and 6 as has been heretofore explained. The reverse movement of the yoke disengages the clutch.

On the top of the housing of the clutch actuating device between the plates 16 and over the place where the members 9 and 10 come together on the outside is fastened a dust guard 20 which is wide enough to cover any opening that may occur between the members, further protecting the clutch actuating device from the introduction of foreign elements.

In the center of yoke 21 is fixedly secured one end 23 of rod 22. The other end of rod 22 is pivoted at 25 to a lever 24 having a handle 26. Lever 24 is pivoted to a hook element 27 at 28. Hook element 27 is securely fastened to a machine frame member 29 by means of set screws 30. Thus, as lever 24 is rotated about fulcrum 28, the rod 22 and yoke 21 are raised and lowered to operate the clutch actuating device as previously described.

The hook element 27 may be applied to the cylindrical machine frame 29 at any angular position desired, the set screws 30 on the top of the hook on each side of that portion underlying the handle of the lever permitting of any adjustment desired.

The lower portions 32 and 33 of members 9 and 10 have a rectangular outline and a similarly shaped pan 34 is secured to member 33 and forms a sump for collecting lubricant which drains through the device. A plug 35 in the bottom of sump 34 provides for the removal of surplus lubricant from time to time.

The above described clutch actuating device is convenient, giving the operator the benefit of his own weight and a substantial leverage in moving handle 26 when he is working against spring 8. There is no twisting action to distort any of the parts. Forces are equally applied on diametrically opposite sides of the members 9 and 10 to move the same and hence there is no tendency to disaline the same or to tilt them on the driving shaft.

By varying the inclination of slots 17, the clutch might be engaged by lowering handle 24 instead of by raising it as illustrated.

Obviously the details of the described structure may be varied without departing from the spirit of my invention and I contemplate the exclusive use of all modifications of my invention which are included in the scope of my claims.

I claim:

1. In combination, a rotating shaft, spaced collars secured to said shaft, a driven member rotatably mounted on said shaft between said collars and adjacent to one of them, and a clutch actuating device between said driven member and the other collar and including two non-rotatable housing members in telescoping relation to each other and movable longitudinally with reference to each other and to said shaft, a rod operatively connected to said members and extending radially from said members, and means operated by the outward movement of said rod for moving said members toward each other.

2. In a clutch actuating device, shaft receiving sleeves movable to and from each other, said sleeves being separate from clutch driving and driven members, a spring on said sleeves tending to hold them apart, housing members having slidable telescoping bearing on each other and slidably fitting around said sleeves and completely enclosing the same, there being engagement between said sleeves and said members whereby said sleeves are moved toward each other when said members are moved toward each other.

3. A clutch actuating device separate from clutch driving and driven elements and comprising sleeves adapted to be slidably mounted on a rotatable driving shaft, there being projections on said sleeves, a compressed spring seated against said projections, a pair of telescoping members having cylindrical portions each engaging one of said sleeves and slidably bearing on each other, and shoulders on said members adapted to engage said projections to move said sleeves toward each other when said members are moved toward each other.

4. In a device of the class described, two telescoping members, rotating sleeves journalled in said members, means for lubricating the interior of said members and a sump in the shape of a pan having upstanding walls secured to the lower portions of one of said members and extending along the walls of the lower portion of the other member.

5. In combination, a driving shaft having a holding collar rigidly secured thereto, a clutch device comprising a driven member freely rotatable on said shaft and spaced from said collar and a driving wheel rotatable with said shaft and located on the side of said driven member opposite said holding collar, and clutch actuating mechanism separate from said clutch device and including a pair of sleeves on said shaft between said driven member and said holding collar, a spring normally impelling said sleeves apart and holding said driving collar and driven member in operative engagement, telescoping non-rotatable housing members spaced longitudinally of said shaft from said driven member and enclosing said sleeves, means for drawing said sleeves together, and elements on each of said housing members for engaging cooperating elements on said sleeves for drawing said sleeves together to compress said spring and release said clutch.

6. In combination, a driving shaft, a driven member freely rotatable thereon, a clutch including a driving collar, and clutch actuating mechanism separate from said driven member and driving collar and comprising sleeves slidably mounted on said shaft, there being projections on said sleeves, a compressed spring seated against said projections, telescoping members having cylindrical portions each engaging one of said sleeves and slidably bearing on each other, and shoulders on said members adapted to engage said projections to move said sleeves toward each other when said members are moved toward each other.

7. A separate actuating device for application to a shaft having driving and driven members mounted thereon and including spaced sleeve elements, a spring normally impelling said sleeve elements apart to force together the clutch driving and driven members, telescoping cylindrical housings operably engaging said sleeve elements and adapted to draw said elements together, said housings in assembled position being spaced longitudinally of the shaft from the clutch driving and driven members and said housings completely enclosing said sleeve elements and spring.

8. In combination, a continuous driving shaft, a driving member rigid therewith, and a driven member rotatable thereon adjacent said driving member and slidable into operative engagement therewith, a holding collar spaced from said members, and actuating means comprising sleeves slidable on said shaft between said collar and said driven member, a spring normally impelling said sleeves apart and said driving and driven members into operative engagement, telescoping nonrotatable housing members engaging respective sleeves, and means for moving said sleeves towards and away from each other, said housing members being spaced longitudinally of said shaft from said driving and driven members and completely enclosing said sleeves and spring and serving to exclude all dust therefrom.

9. A separate actuating device for application to a shaft having driving and driven members mounted thereon and including spaced sleeve elements, a spring normally impelling said sleeve elements apart to force together the clutch driving and driven members, telescoping cylindrical housings completely enclosing said sleeve elements and spring and operably engaging said sleeve elements, a plate pivoted to one of said housings and having a cam slot, a stud on the other housing inserted in said slot, and means for revolving said plate to move said housings towards or away from each other to disengage or engage the clutch.

In testimony whereof I hereunto affix my signature this 6th day of September, 1929.

ERNEST DUNFORD.